(12) United States Patent
Sakane et al.

(10) Patent No.: US 7,302,120 B2
(45) Date of Patent: Nov. 27, 2007

(54) OPTICAL MODULATOR

(75) Inventors: Toshio Sakane, Tokyo (JP); Norikazu Miyazaki, Tokyo (JP); Kaoru Higuma, Tokyo (JP); Shingo Mori, Tokyo (JP)

(73) Assignee: Sumitomo Osaka Cement Co., Ltd., Tokyo (JP)

( * ) Notice: Subject to any disclaimer, the term of this patent is extended or adjusted under 35 U.S.C. 154(b) by 42 days.

(21) Appl. No.: 11/315,615

(22) Filed: Dec. 22, 2005

(65) Prior Publication Data

US 2006/0285787 A1 Dec. 21, 2006

(30) Foreign Application Priority Data

Dec. 24, 2004 (JP) ............................. 2004-374119

(51) Int. Cl.
*G02F 1/035* (2006.01)
(52) U.S. Cl. ............................................................ 385/3
(58) Field of Classification Search ................ 385/1, 385/3
See application file for complete search history.

(56) References Cited

U.S. PATENT DOCUMENTS

| | | | |
|---|---|---|---|
| 7,224,506 B2 * | 5/2007 | Kim et al. | 359/276 |
| 7,239,763 B2 * | 7/2007 | Kawanishi et al. | 385/1 |
| 7,245,787 B2 * | 7/2007 | Kawanishi et al. | 385/1 |
| 2002/0171900 A1 * | 11/2002 | Ono et al. | 359/181 |

FOREIGN PATENT DOCUMENTS

JP  2001-159750  6/2001

OTHER PUBLICATIONS

Phillips, M.R., et al. (1996) Chromatic Dispersion Effects in CATV Analog Lightwave Systems using Externally Modulated Transmitters, Optical Fiber Communication '96, vol. 2, 1996 Technical Digest Series, Postconference Edition, Optical Society of America, 395-398, 1996, no month available.

* cited by examiner

*Primary Examiner*—Quyen P Leung
(74) *Attorney, Agent, or Firm*—Chapman and Cutler LLP

(57) ABSTRACT

An optical modulator which magnifies a modulation index and reduces affection of SBS by suppressing a light source carrier component in an equivalent light source spectral width and performs more long-distance transmission by suppressing one of sideband spectrums generated by a modulation signal to reduce affection of fiber dispersion, having a light branch means that branches input light having a carrier component into two light waves; a SSB modulation means that modulates one branched wave and generates a wave having the carrier component and one sideband spectrum; an intensity adjustment means that adjusts intensity of the carrier component of the other wave; a phase adjustment means that adjusts the phase of the carrier component with respect to at least one of the two waves; and a multiplexing means that multiplexes the two waves passing through the modulation means, and the intensity and phase adjustment means, and emits output light.

20 Claims, 7 Drawing Sheets

(a)            (b)

(a)

(b)

(c)

(d)

(e)

OPTICAL MODULATOR

BACKGROUND OF THE INVENTION (1) Field of the Invention

The present invention relates to an optical modulator, and more particularly, to an optical modulator which can transmit a sub-carrier multiplexing (SCM) signal with a large output using an optical fiber.

(2) Related Art Statement

A broadcasting wave or a CATV wave is a SCM signal obtained by intensity-modulating a plurality of radio frequency (RF) carriers having an interval of 6 MHz based on a multi-channel (CH) video or audio signal. In order to transmit the SCM signal using an optical fiber, in a hybrid-fiber coaxial (HFC) system or a fiber-to-the-premise (FTTP) system, a direct modulation (DM) method of intensity-modulating light of a laser diode (LD) by the SCM signal according to the length of the fiber, the distribution number or the like, or an external modulation (EXT-M) method of intensity-modulating continuous light of a laser diode (LD) by the SCM signal using a lithium niobate (LN) modulator is employed.

In the direct modulation method, frequency variation (chirp) associated with the intensity modulation is large and a transmission distance is restricted by a complex second-order distortion generated by chromatic dispersion of the fiber. Meanwhile, in the external modulation method, a LN modulator is generally employed, the chirp is small and the modulator itself does not cause the CSO distortion, thereby performing more long-distance transmission.

FIG. 1 illustrates a configuration of a CATV transmitter (TX) employing a LN modulator.

Reference numeral 1 denotes a light source, reference numeral 2 denotes a LN modulator, reference numeral 3 denotes a LN modulation element, reference numeral 4 denotes a phase modulation unit, reference numeral 5 denotes an intensity modulation unit, and reference numeral 6 denotes a DC phase adjustment unit for setting an operation point of the intensity modulation unit.

As the light source 1, a DFB laser having low phase noise (RIN noise) and a small line width is used. As a wavelength band thereof, a band of 1.3 μm has been much used, but a band of 1.5 μm has become mainstream along with the popularization of an EDFA (Erbium-Doped Fiber Amplifier).

Although the below description will be made based on the band of 1.5 μm, the band of 1.3 μm is similar except the EDFA. The output power of the DFB laser 1 becomes stable by an APC (Automatic Power Control) circuit 7. A micro wave (SCM-RF signal) related to the SCM signal is applied to the intensity modulation unit of the LN modulator 2 through a driver 9. At this time, an operation point which is a center of the modulation operation is controlled through an ABC circuit 10 and set to an intermediate point (Quad) of p-p intensity of a modulation output waveform by adjusting a DC voltage (bias) applied to the DC phase adjustment unit 6. In addition, the ABC circuit monitors light output from the LN modulator.

The SCM-RF wave from a SCM-RF signal source 12 is a RF signal obtained by modulating carriers (CH carriers) having an interval of 6 MHz using a VSB method in an analog video and using an OFDM and 64QAM method in a digital video over 70 MHz to 860 MHz.

By the intensity modulation, the output light spectrum becomes modulation spectrum (DSB modulation wave) of $f_0 \pm$(70 MHz to 860 MHz) at the both sides of a light source carrier having a frequency $f_0$ and power $P_0$ as shown in FIG. 2. Here, a sign (+) is referred to as an upper side band (USB) and a sign (−) is referred to as a lower side band (LSB). In addition, the intensity of the modulation spectrum depends on the intensity of the RF signal of each CH carrier, and the intensity of the spectrum is denoted by Pr.

An intensity ratio $Pr/P_0$ is a modulation index per each CH carrier and is generally about 3% because of the linearity of the LN modulator. In this case, the spectral band width (FWHM) of the output light (an input light frequency component and a carrier component $P_0$) is the same as the spectral width of the light source, and SBS (Simulated Brillouin scattering) is induced at about 9 dBm when the output light is input to a 1.3-μm SSMF (Standard Single Mode Fiber) which is a general transmission medium, and, although the output of the light input to the fiber more increases, an increment is not transmitted and returns to an input side.

A power threshold value for inducing the SBS varies depending on the fiber or the spectral width of the light source. A general DFB laser has a line width of about 3 MHz. In this case, the SBS threshold value is about 9 dBm (Pn). When an equivalent spectral width of the light source increases by any means, the SBS threshold value (Psbs) increases with respect to the increment $\Delta v_D$, as expressed by Equation 1.

$$Psbs/Pn = 10 \cdot \log(1 + \Delta v_D / \Delta v_B) \quad (1)$$

Where, $\Delta v_D$ denotes a Brillouin gain width of the fiber and is about 65 MHz in the SSMF. For example, if $\Delta v_D$ is 860 MHz, the SBS threshold value increases by 11.5 dB, that is, the SBS threshold value becomes about 20 dBm.

In order to increase $\Delta v_D$, conventionally, as shown in FIG. 1, a method of providing the phase modulation unit 4 in the LN modulation element 3, amplifying a signal from a single frequency signal source 11 having a frequency fm using an amplifier 8 to drive the phase modulation unit 4, strongly modulating a phase having a modulation index of at least two, spreading out the spectrum of the light source, and intensity-modulating the spread spectrum of the light source by the SCM-RF signal is employed.

The spectrum of the modulation wave in this case is shown in FIG. 3. Here, fm denotes a frequency which does not cause overlap between the adjacent USB and LSB. In general, fm may be 2 GHz. The light source carrier $f_0$ is magnified to $f_0 \pm$fm, $f_0 \pm$2fm, . . . by the modulation, as shown in FIG. 3, and, as shown, each magnified light source carrier has modulation spectrums of the modulation waves USBn and LSBn by the SCM-RF signal, respectively (n is an integer).

The sizes of the respective light source carriers are defined as $J_n^2(m)$ and the distribution thereof varies depending on a phase modulation index m. For example, if a value m having the substantially same size until n=2 is employed, the light source spectral width is about 8 GHz and the SBS threshold value increases by about 100 times based on Equation 1.

According to the method shown in FIG. 1, SBS resistance increases and high-output light can be input to the transmission fiber, but a failure due to the magnification of the spectral width occurs. In other words, when a 1.3-μm single mode fiber (SMF) is used in the band of 1.5 μm, a transmission delay difference occurs between the modulation waves USBn and LSBn by the chromatic dispersion characteristics of the fiber and a detection RF wave is distorted in a square-law detection using a conventional photodiode (PD). The CSO distortion in this case is disclosed in Non-patent document 1 and is expressed by Equation 2.

$$\text{CSO (dB)}=10\cdot\log\{N_{cso}[\tfrac{3}{8}(\lambda^2/2\pi C\cdot DL)^2\cdot\Sigma m_{pm}^2(fm)^4\cdot mi]^2\} \quad (2)$$

Where, Ncso denotes the number of evaluated CHs, $m_{pm}$ denotes a phase modulation index of the phase modulation unit, mi denotes an intensity modulation index, $\lambda$ denotes an optical center wavelength, C denotes a vacuum light speed, D denotes the chromatic dispersion of the fiber and is about 17 ps/nmkm, L denotes the length of the fiber, and $\Sigma$ denotes the sum of the light carriers.

[Non-patent document 1] M. R. Phillips et. al. "Chromatic dispersion effects in CATV analog light wave system using externally modulated transmitters" Optical Fiber Communication '96 Postdeadline papers 17-2

As expressed by Equation 2, the CSO distortion significantly increases by $m_{pm}$ and fm. In order to maintain a defined value (−65 dBc) (dBc is a value of the carrier), the transmission distance L must be reduced. In other words, when the modulation degree and the modulation frequency of the phase modulation unit increase in order to increase the SBS resistance, the transmission distance is restricted by the chromatic dispersion of the fiber.

Furthermore, $m_{pm}$ is about 2 and fm is about 2 GHz, but, in this case, a radio frequency amplifier having an output of a few W (Watts) is required and low power consumption and downsizing of the system cannot be realized.

Meanwhile, as described in Patent document 1, a method of adjusting an output of a light source carrier to improve a ratio between the outputs of the light source carrier and a sideband is disclosed. FIG. 4 illustrates a configuration of the method. Light from a light source 20 is branched into two light waves by a branch unit 21. One light wave is phase-modulated at the same frequency by a phase modulator 22 and an intensity modulator 23, and is DSB-intensity-modulated by adjusting a relationship between a modulation index and a phase. The other light wave is phase-shifted by an optical phase shifter (adjuster) 24. Then, the interferences of the both light waves are multiplexed by a multiplexer 25 and interference light is then output as modulation light.

[Patent document 1] Japanese Unexamined Patent Application Publication No. 2001-159750

The variation of the light spectrum generated by the above-mentioned configuration is shown in FIG. 5. The light spectrum from the light source 20 is a single mode light, as shown in FIG. 5A. When the light passes through the phase modulator 22, the single light source spectrum is divided into a plurality of light source carriers, as shown in FIG. 5B, and the respective light source carriers are intensity-modulated by the intensity modulator 23, thereby generating sideband components between which each light source carrier is sandwiched, as shown in FIG. 5C. Meanwhile, the other branched light wave branched by the branch unit 21 is shifted by the phase adjuster 24 in an opposite phase state, as shown in FIG. 5D. When the both light waves are synthesized by the multiplexer 25, the light output of the central light source spectrum is reduced, as shown in FIG. 5E.

When comparing the light wave emitted from an optical modulation system shown in FIG. 5E with the modulation light spectrum using the conventional phase modulator and intensity modulator shown in FIG. 5C, the intensities Pr of the USB and LSB are identical to each other, but a light source carrier component $P_0'$ is greatly less than $P_0$, and $Pr/P_0'$, which is the modulation index m, more increases than $Pr/P_0$. In addition, since a modulation curve of a LN intensity modulator has sine wave characteristics, when RF intensity modulation is performed focusing around a Quad point, an odd functional modulation is performed and a second-order distortion component does not appear.

When the size of the RF signal increases, the modulation curve is deviated from a straight line and thus a third-order distortion component and an odd-order harmonic component are output. In the LN modulator, the modulation index is about 0.15 and a CTB (Composite triple beat: third-order distortion) reaches the defined value (−65 dBc). In general, m per CH is about 0.03, the number of CHs is 10 CH, and a total modulation index $m_t$ in this case is about 0.3. In addition, since the CTB in this case is about −40 dBc, a method of providing a distortion correction circuit 13 between the signal source 12 and the driver 9 to previously distort the RF signal with an opposite polarity of the distortion of the intensity modulator is generally used, as shown in FIG. 1.

In the configuration shown in FIG. 4, as shown in FIG. 5E, it is possible to keep Pr in a linear intensity modulation range of the LN modulator and to reduce the light carrier to maintain the modulation index of about 0.3. In other words, it is possible to realize a system in which the distortion correction circuit 13 is unnecessary.

However, when adjusting $P_0'$ which is the light source carrier component, a branch ratio of the branch unit 21 is very important, but, in Patent document 1, adjustment of the branch ratio is not described. In addition, as an effect, only distortion suppression is described and fiber dispersion affecting the transmission distance is not considered.

Furthermore, as mentioned above, the CSO distortion significantly increases by the modulation frequency fm in the phase modulation unit 22, but reduction of fm is not considered.

The present invention is directed to solve the above-mentioned problems. Accordingly, an object of the present invention is to provide an optical modulator which magnifies a modulation index and reduces affection of SBS by suppressing a light source carrier component in an equivalent light source spectral width and performs long-distance transmission by suppressing one side of sideband spectrum generated by a modulation signal to reduce affection of fiber dispersion.

In addition, another object of the present invention is to provide an optical modulator in which these functions are incorporated on one substrate and which can reduce the number of peripheral circuits and have excellent cost performance.

SUMMARY OF THE INVENTION

According to the invention of claim 1, provided is an optical modulator including a light branch means that branches input light having a carrier component into two light waves; a SSB modulation means that optically modulates one branched light wave and generates a light wave having the carrier component and one sideband spectrum; an intensity adjustment means that adjusts light intensity of the carrier component of the other branched light wave; a phase adjustment means that adjusts the phase of the carrier component with respect to at least one of the two branched light waves; and a multiplexing means that multiplexes the two light waves passing through the SSB modulation means, the intensity adjustment means, and the phase adjustment means and emits output light.

According to the invention of claim 2, in the optical modulator of claim 1, the SSB modulation means may have a Mach-Zehnder optical waveguide having two branch waveguides, and electrical fields of two RF signals having a phase difference of 90° may be applied to the light waves which propagate through the branch waveguides, respectively.

According to the invention of claim 3, in the optical modulator of claim 1 or 2, the intensity adjustment means may have a Mach-Zehnder optical waveguide having two branch waveguides, and an electrical field of a DC voltage may be applied to at least one of the light waves which propagate through the branch waveguides.

According to the invention of claim 4, in the optical modulator of any one of claims 1 to 3, the light branch means or the multiplexing means may be composed of a Y-shaped branch waveguide or a directional coupler.

According to the invention of claim 5, in the optical modulator of any one of claims 1 to 4, the light branch means, the SSB modulation means, the intensity adjustment means, the phase adjustment means, and the multiplexing means may be mounted on the same substrate having an electrooptic effect.

According to the invention of claim 6, in the optical modulator of any one of claims 1 to 5, a phase modulation means may be provided at the previous stage of the light branch means or between the light branch means and the SSB modulation means.

According to the invention of claim 7, in the optical modulator of claim 6, a frequency applied to the phase modulation means may be greater than a maximum modulation frequency applied to the SSB modulation means and less than two times of the maximum modulation frequency.

By the invention of claim 1, since the light intensity related to the carrier component in the output light can be arbitrarily adjusted by the intensity adjustment means, it is possible to set a modulation index m to an optimal value and to reduce affection of SBS, thereby increasing the light input to the fiber. Furthermore, since one sideband spectrum is suppressed by the SSB modulation means, it is possible to suppress a CSO distortion from being generated due to fiber dispersion and to realize long-distance transmission.

By the invention of claim 2, since the SSB modulation means has the Mach-Zehnder optical waveguide having the two branch waveguides and the electrical fields of the two RF signals having the phase difference of 90° are applied to the light waves which propagate through the branch waveguides, respectively, it is possible to efficiently generate a light spectrum in which the carrier component remains and one sideband spectrum is suppressed, by a simple optical and electrical circuit configuration.

By the invention of claim 3, since the intensity adjustment means has the Mach-Zehnder optical waveguide having the two branch waveguides, it is possible to form an optical waveguide structure similar to the SSB modulation means and to suppress the intensities and the phases of the light waves branched by the light branch means from being deviated from each other due to a difference in an optical waveguide structure.

By the invention of claim 4, since the light branch means or the multiplexing means is composed of the Y-shaped branch waveguide or the directional coupler, it is possible to branch and multiplex the light by a simple configuration. In addition, since a control electrode may be, if necessary, provided in the Y-shaped branch waveguide or the directional coupler to control the intensity of the electrical field applied to a coupling portion, it is possible to simply control a branch ratio or a multiplexing degree.

By the invention of claim 5, since the light branch means, the SSB modulation means, the intensity adjustment means, the phase adjustment means, and the multiplexing means are mounted on the same substrate having the electrooptic effect, it is possible to miniaturize the optical modulator itself and to reduce the number of elements such as peripheral circuits. Thus, it is possible to provide an optical modulator having excellent cost performance.

By the invention of claim 6, since the phase modulation means is provided at the previous stage of the light branch means or between the light branch means and the SSB modulation means, it is possible to spread out the light source carrier to a plurality of light source carrier components and to magnify a spectral width. Therefore, it is possible to reduce affection of SBS, thereby increasing the light input to the fiber.

By the invention of claim 7, since the frequency fm applied to the phase modulation means is greater than the maximum modulation frequency applied to the SSB modulation means and less than two times of the maximum modulation frequency, it is possible to more reduce the frequency fm than that in a case of using a conventional phase modulation means and to efficiently suppress a CSO distortion. In addition, since the frequency fm can be reduced to about a half of a conventional frequency (conventionally, at least two times of the maximum frequency applied to the intensity modulator for generating the sideband), the CSO distortion is significantly reduced.

REFERENCE NUMERAL

Figure 1:
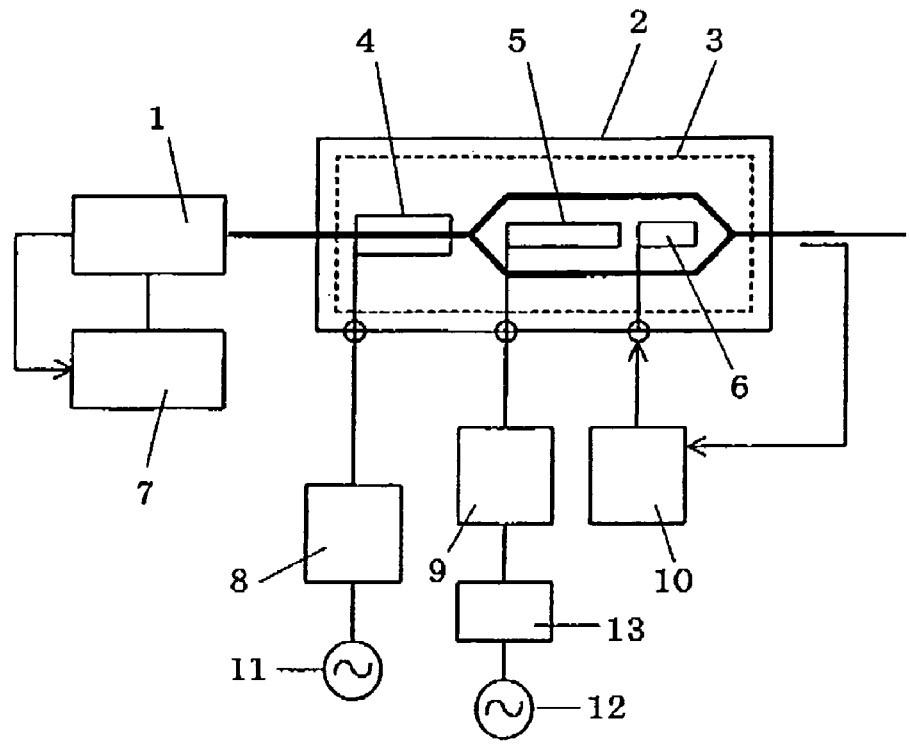
FIG. 1 is a schematic diagram of a conventional CATV transmitter using a LN modulator.
Figure 2:
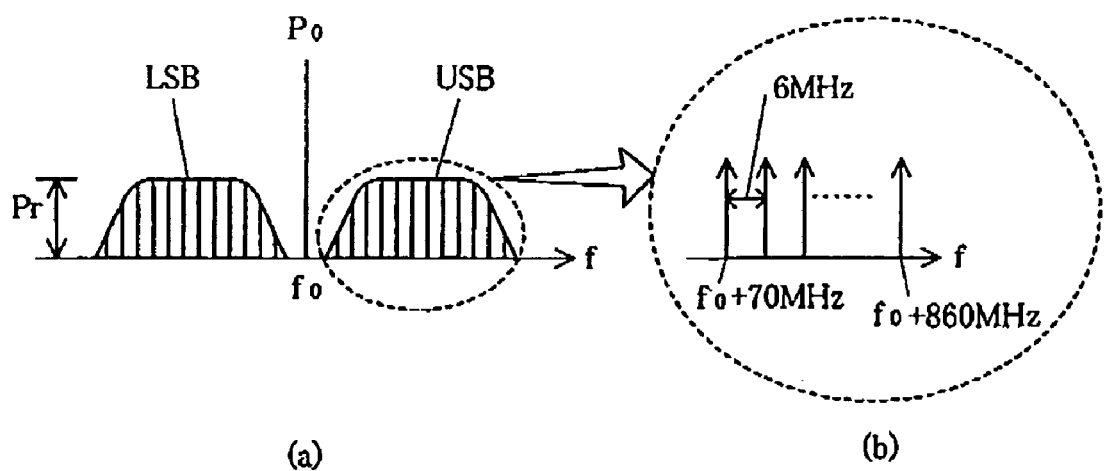
FIG. 2 illustrates a shape of light output spectrum generated by intensity modulation of FIG. 1.
Figure 3:
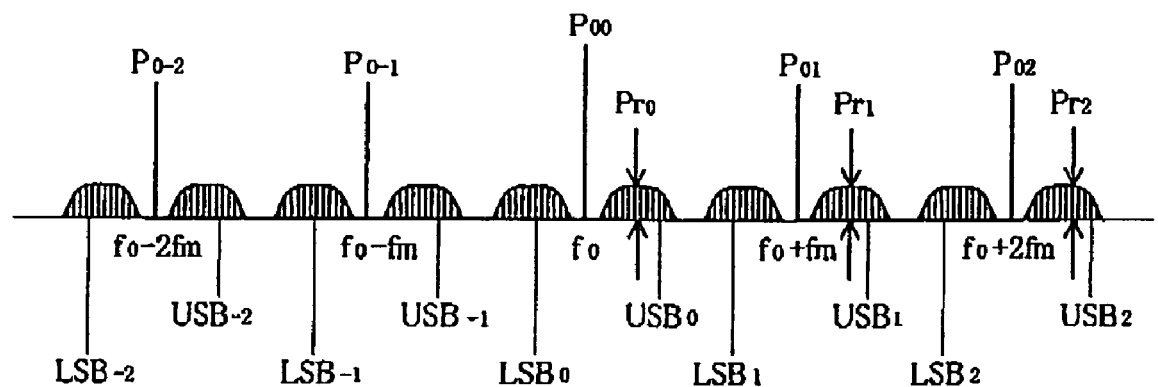
FIG. 3 illustrates a shape of light spectrum output from an optical modulator of FIG. 1.
Figure 4:
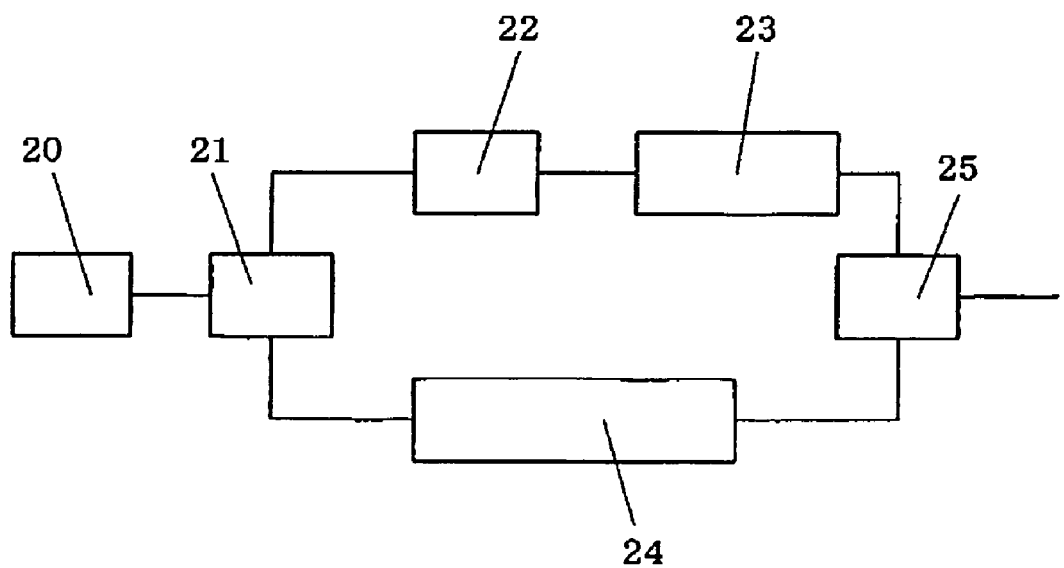
FIG. 4 is a schematic block diagram of another conventional optical modulator.
Figure 5:
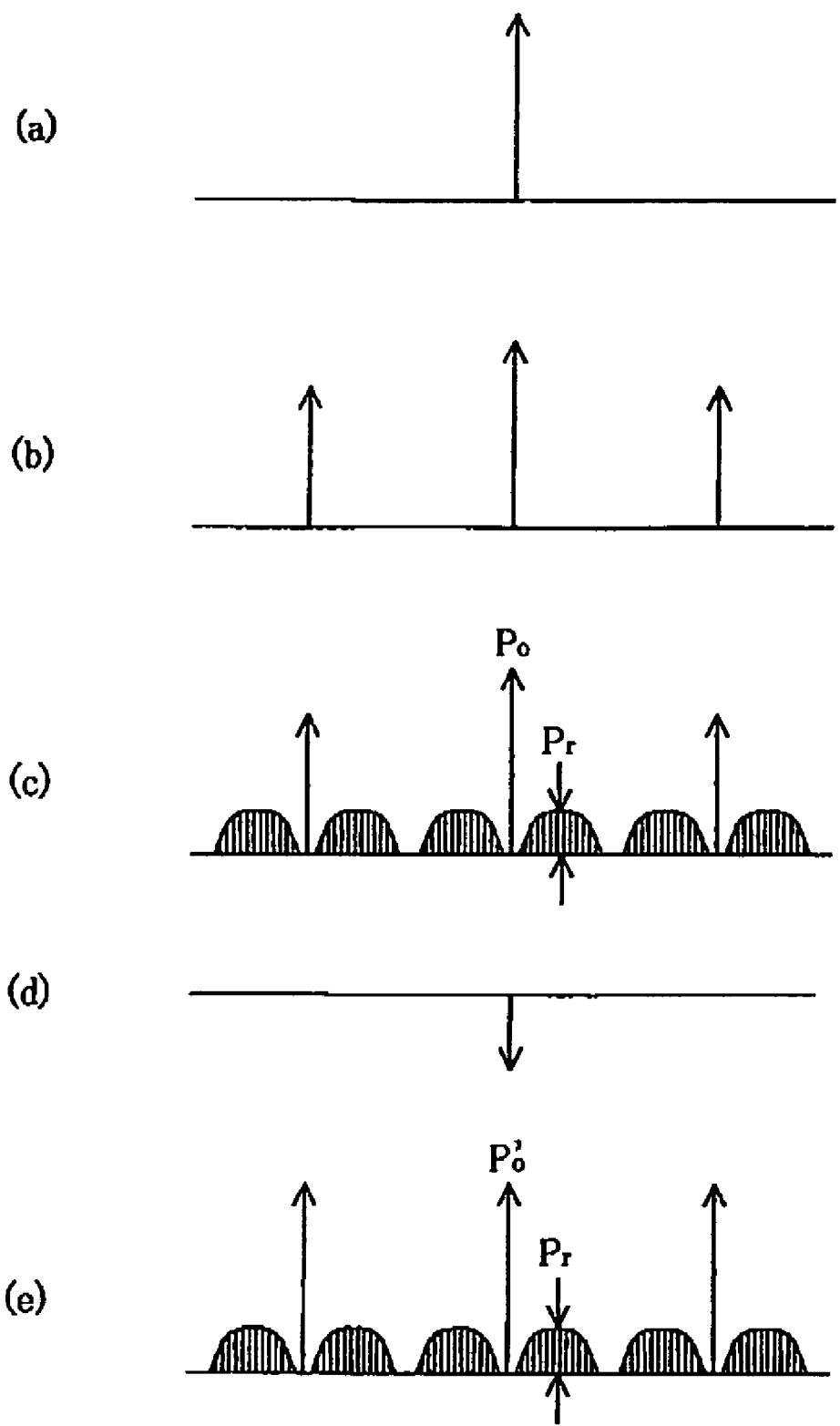
FIG. 5 illustrates variation of light spectrum in the optical modulator of FIG. 4.

1: DFB laser
2: LN modulator
3: LN modulation element
4: phase modulation unit
5: intensity modulation unit
6: DC phase adjustment unit
7: APC circuit
8: amplifier
9: driver
10: ABC circuit 11: single frequency signal source
12: SCM-RF signal source
13: distortion correction circuit
20: light source
21: branch unit
22: phase modulator
23: intensity modulator
24: phase adjuster
25: multiplexer
30: light branch means
31: SSB modulation means
32: intensity adjustment means
33: phase adjustment means
34: multiplexing means
40: input optical fiber
41: substrate
42, 49: directional coupler
43, 46: Mach-Zehnder optical waveguide
44, 45: modulation electrode
47: intensity-adjustment DC bias electrode
48: phase-adjustment DC bias electrode
50: output optical fiber
51: 90° phase shifter
52: RF signal source
53: DC bias power supply source
54: intensity-adjustment DC power supply source
55: phase-adjustment DC power supply source
60, 61: phase modulation means

DETAILED DESCRIPTION OF THE INVENTION

Hereinafter, exemplary embodiments of the present invention will be described in detail.

Figure 6:
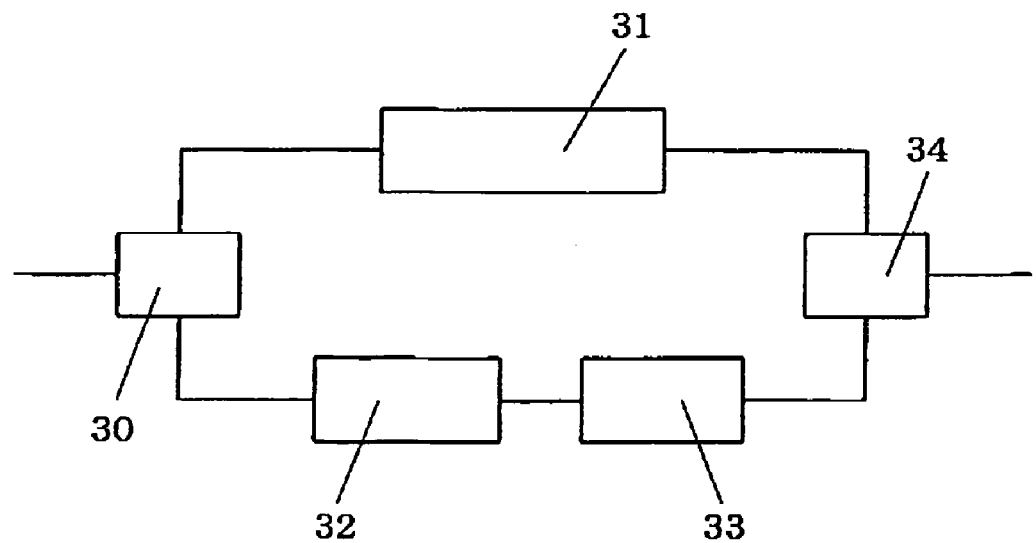
FIG. 6 is a schematic block diagram of an optical modulator according to the present invention.

As shown in FIG. 6, an optical modulator according to the present invention includes a light branch means 30 for branching input light having the same carrier component as that of single mode light into two light waves, a SSB modulation means 31 for optically modulating one branched light wave and generating a light wave having the carrier component and one sideband spectrum, an intensity adjustment means 32 for adjusting a light intensity of the carrier component of the other branched light wave, a phase adjustment means 33 for adjusting the phase of the carrier component of at least one of the two branched light waves, and a multiplexing means 34 for multiplexing the two light waves passing through the SSB modulation means 31, the intensity adjustment means 32, and the phase adjustment means 33 to emit output light.

The light wave input to the optical modulator according to the present invention is not limited to the light wave having the single mode, and multi-wavelength light which is discrete at a predetermined frequency interval may be input. A DFB laser is used as a light source, and, in order to stabilize a wavelength or an output, an automatic power control circuit (APC circuit) may be adequately provided in the light source. In addition, in a case of using the multi-wavelength light, a plurality of laser diodes may be provided such that the light waves emitted from the respective light sources are multiplexed and introduced, or single mode light may be spread out in a plurality of light source spectrums using the phase modulation means, as mentioned below.

Figure 7:
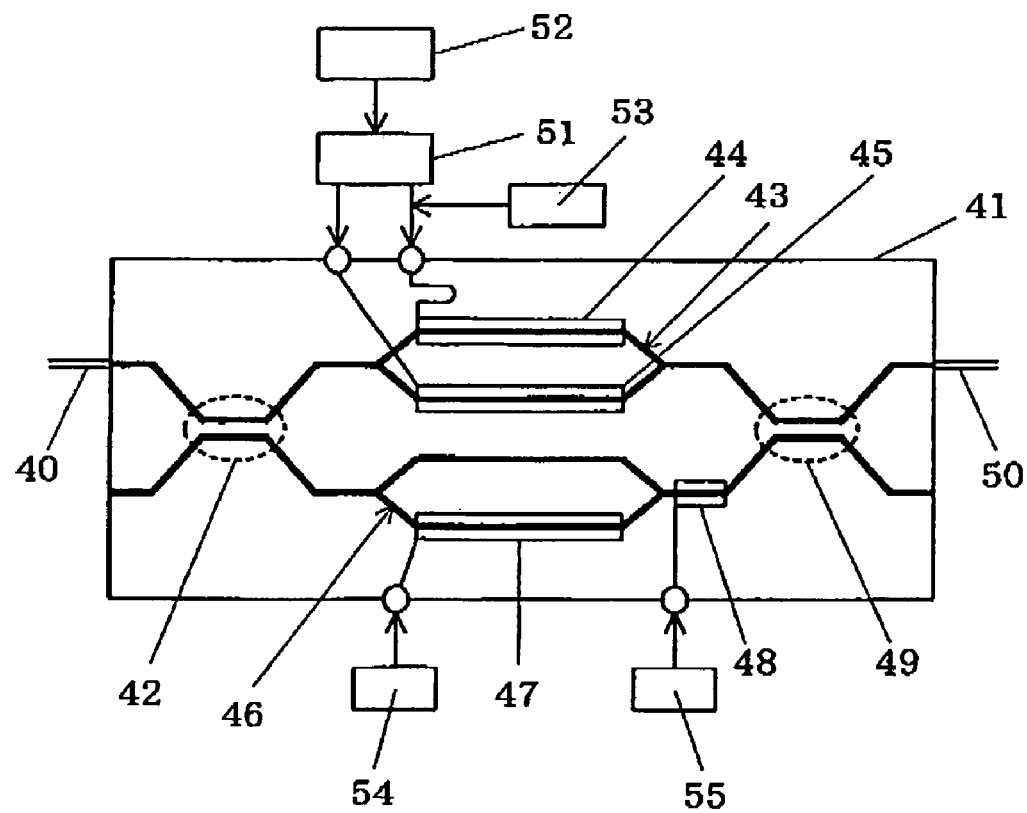
FIG. 7 is a schematic diagram illustrating an optical modulator formed on a single substrate.

The various existing optical components such as an optical coupler, an electro-absorption optical modulator, a waveguide optical modulator are used in the light branch means 30, the SSB modulation means 31, the intensity adjustment means 32, the phase adjustment means 33, and the multiplexing means 34, which configure the optical modulator. In the present invention, in order to reduce the number of the elements and an assembling work and improve reliability of a product, necessary optical element is preferably mounted on a single substrate 41 having an electrooptic effect, as shown in FIG. 7.

The substrate having the electrooptic effect used in the optical modulator is made of, for example, lithium niobate, lithium tantalate, PLZT (Lead Lanthanum Zirconate Titanate), and a silica-based material. In addition, an optical waveguide on the substrate can be formed by diffusing Ti or the like in the surface of the substrate using a thermal diffusion method or a proton-exchange method. Furthermore, various kinds of electrodes such as a modulation electrode and a ground electrode surrounding the modulation electrode are formed on the surface of the substrate by a method of forming an electrode pattern of Ti—Au and a gold plating method or the like. Moreover, a buffer layer such as dielectric $SiO_2$ may be provided on the surface of the substrate after forming an optical waveguide, if necessary.

The substrate 41 configuring the optical modulator is connected with an input optical modulator 40 and an output optical fiber 50. Hereinafter, an internal configuration of the optical modulator will be described in detail, while comparing FIG. 6 with FIG. 7. A directional coupler 42 of FIG. 7 corresponds to the light branch means 30 of FIG. 6. The light branch means 30 is not limited to the directional coupler, and a Y-shaped branch waveguide may be used. In addition, in order to adjust the output of the branched light wave, a configuration of disposing a control electrode in a branch unit may be employed.

The respective light waves branched from the light branch means pass through Mach-Zehnder optical waveguides 43 and 46 and are multiplexed by a directional coupler 49 which is a multiplexing means 34. Similar to the light branch means 30, a Y-shaped branch waveguide may be used as the multiplexing means 34 or a control electrode may be disposed in order to control the multiplexing state. Since two Mach-Zehnder optical waveguides are used, the respective light waves branched by the light branch means propagate through the optical waveguides having the similar structure, and, when an optical modulation operation is not performed, an intensity difference or a phase difference between the light waves can be greatly suppressed.

As the SSB modulation means 31, modulation electrodes 44 and 45 are provided in correspondence with the respective branch waveguides of the Mach-Zehnder optical waveguide 43, and a RF signal from a RF signal source 52 is shifted by a 90° phase shifter 51 to become two RF signals having a phase difference of 90°, which are applied to the modulation electrodes 44 and 45, respectively. In FIG. 7, for clarity, the ground electrode is not shown. When a modulation operation point is adjusted at the time of SSB modulation, a DC bias power supply source 53 can adjust the bias of a modulation signal. In addition, in a signal input line from the 90° phase shifter 51 to the modulation electrodes 44 and 45, it is preferable that the lengths or the widths of the signal input lines are adjusted such that signals reach the modulation electrodes while maintaining the phase difference by, for example, bending a portion of the line.

Figure 8:
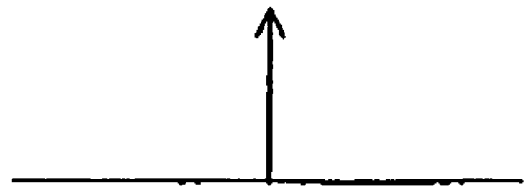
FIG. 8 illustrates variation of light spectrum in the optical modulator of FIG. 6 or FIG. 7.
Figure 8:
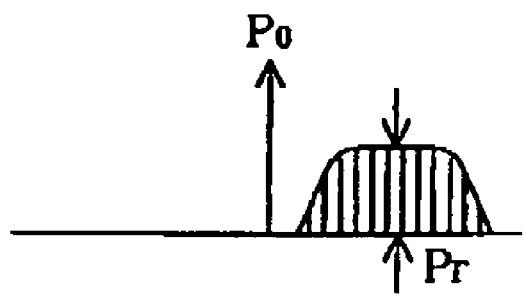
Figure 8:
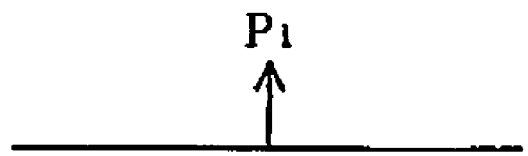
Figure 8:
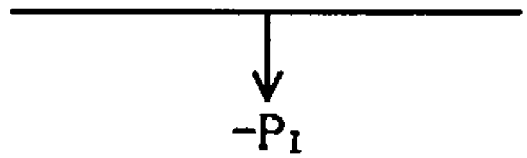
Figure 8:
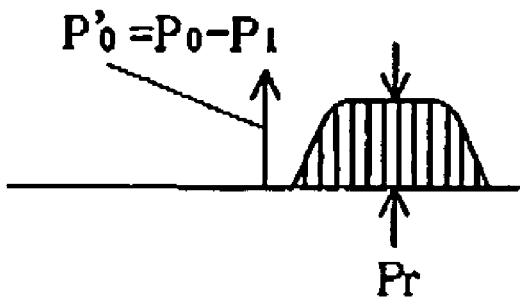

Accordingly, the light source spectrum input to the optical modulator itself or the SSB modulation means 31 shown in FIG. 8A is converted into light spectrum output from the SSB modulation means 31, in which the light source carrier remains and one sideband is suppressed, as shown in FIG.

8B. The light output of the light source carrier component is denoted by $P_0$ and an average output of the sideband is denoted by Pr.

Next, the intensity adjustment means 32 and the phase adjustment means 33 for modulating the other light wave branched by the light branch means 30 will be described.

The intensity adjustment means 32 is composed of a Mach-Zehnder optical waveguide 46, as shown in FIG. 7. One or both of the branch waveguides of the Mach-Zehnder optical waveguide 46 is provided with an intensity-adjustment DC bias electrode 47, which is applied with a predetermined voltage from an intensity-adjustment DC power supply source 54. In a case of forming the intensity-adjustment DC bias electrodes in the two branch waveguides, a DC voltage used in the intensity adjustment means can be reduced by adjusting a voltage value such that directions of the electrical fields applied to the branch waveguides are opposite to each other.

By the intensity adjustment means 32, the light source spectrum before the light wave is input to the intensity adjustment means shown in FIG. 8A is converted into the light spectrum in which the intensity of the light source spectrum is suppressed as shown in FIG. 8C. The light output of the light spectrum of which intensity is adjusted is denoted by $P_1$.

As shown in FIG. 7, the phase adjustment means 33 has a phase-adjustment DC bias electrode 48 disposed along the optical waveguide at the next stage of the intensity adjustment means 32 and at the previous stage of the multiplexing means 34. The phase-adjustment DC bias electrode 48 is applied with a predetermined voltage from a phase-adjustment DC power supply source 55. By the phase adjustment means 33, the light spectrum passing through the intensity adjustment means 32 (FIG. 8C) becomes the light output shifted in the opposite phase state, as shown in FIG. 8D. In consideration of the opposite phase state, the light output of the light spectrum at this time is denoted by $-P_1$.

In addition, the light wave (FIG. 8D) passing through the phase adjustment means 33 and the light wave (FIG. 8B) passing through the SSB modulation means 31 are multiplexed by the multiplexing means 34 to become a light output $P_0'$ (=$P_0-P_1$).

Meanwhile, the position of the phase adjustment means 33 is not limited to that shown in FIG. 7, and the phase adjustment means 33 may be positioned at the previous or next stage of the SSB modulation means 31, the previous stage of the intensity adjustment means 32, or the inside of the Mach-Zehnder optical waveguide for configuring the intensity adjustment means 32.

A modulation index of the optical modulator according to the present invention is $Pr/P_0'$, which is greater than the conventional $Pr/P_0$. To this end, it is possible to reduce the affection of the SBS and to increase the light input to the fiber. In addition, since the light intensity related to the carrier component in the output light can be arbitrarily adjusted by the intensity adjustment means, it is possible to set a modulation index m to an optimal value. Furthermore, since one sideband spectrum is suppressed by the SSB modulation means, it is possible to suppress a CSO distortion from being generated due to fiber dispersion and to realize long-distance transmission.

Next, optical modulators according to the other embodiments of the present invention will be described.

Figure 9:
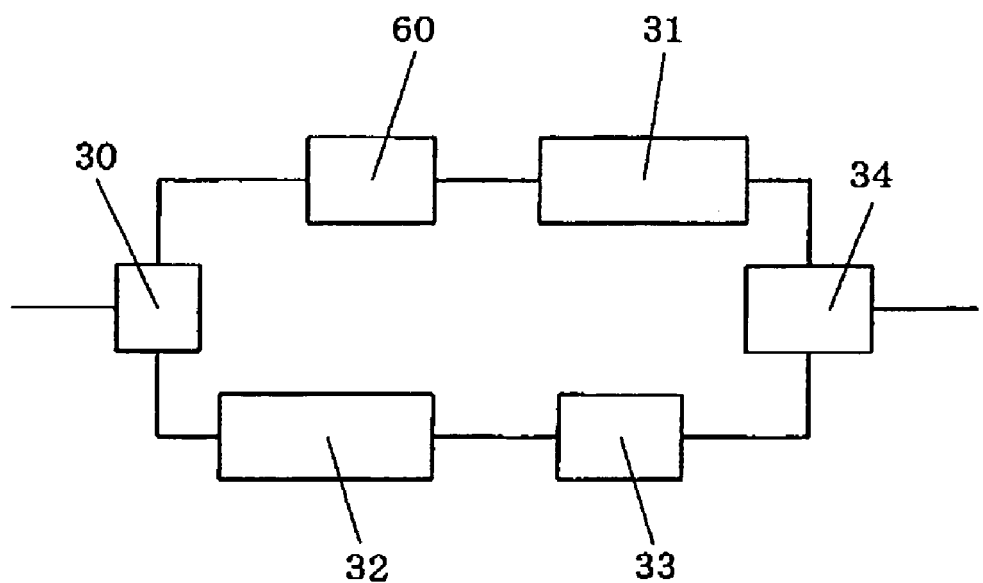
FIG. 9 is a schematic block diagram illustrating another embodiment of the present invention.

The optical modulator shown in FIG. 9 is different from the modulator shown in FIG. 6 in that a phase modulation means 60 is further provided between the light branch means 30 and the SSB modulation means 31. For example, a means for spreading out the light source spectrum, which is the single mode light, to a plurality of light source carrier components is mounted.

Figure 11:
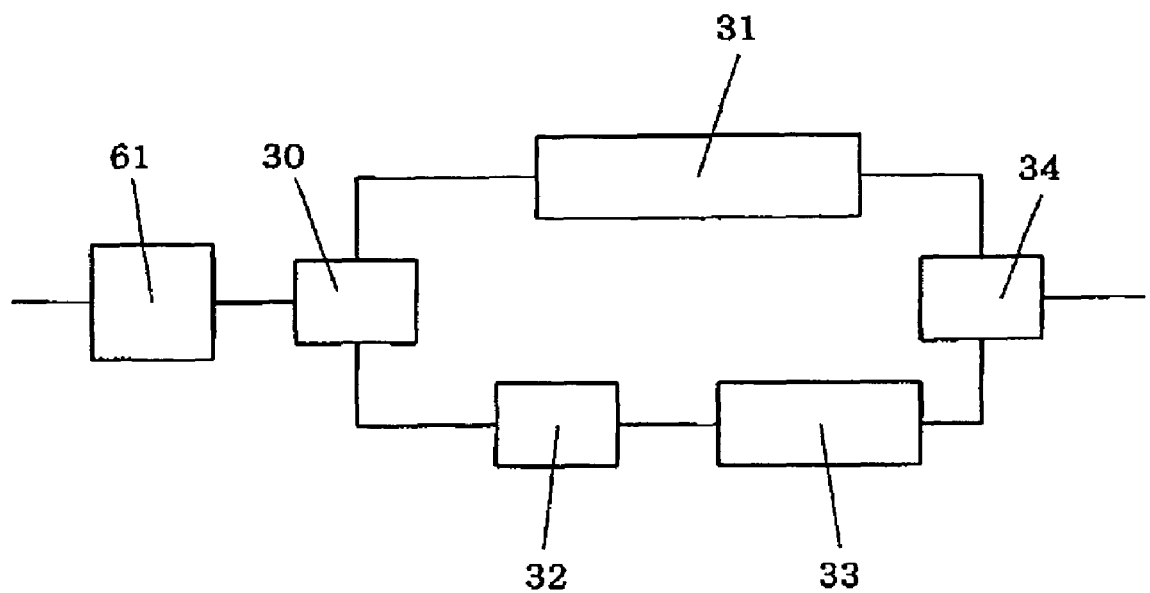
FIG. 11 is a schematic block diagram illustrating another embodiment of the present invention.

In addition, in FIG. 11, a phase modulation means 61 is provided at the previous stage of the light branch means 30. Similarly, a means for spreading Out the light source spectrum to a plurality of light source carrier components is used.

By spreading out the light source spectrum to the plurality of light source carrier components, it is possible to improve SBS resistance of the optical fiber and to allow high-output light to be input to the optical fiber.

Figure 10:
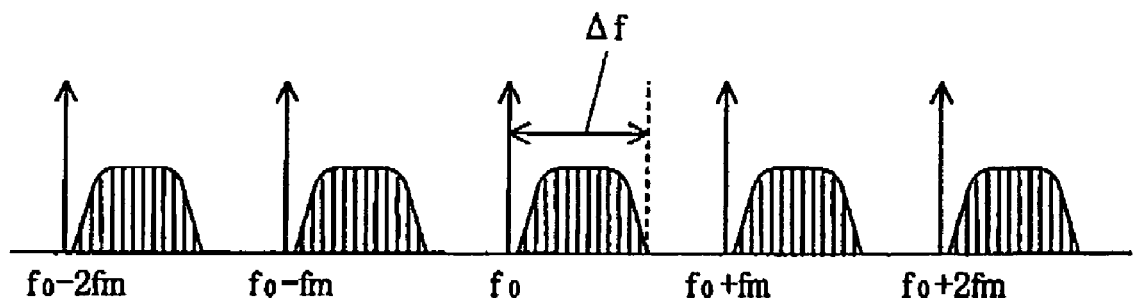
FIG. 10 illustrates a shape of spectrum distribution of output light of the optical modulator related to FIG. 9 or FIG. 11.

Furthermore, since only one sideband is generated in the optical modulator according to the present invention, as shown in FIG. 10, for example, the USBs are generated only in the right sides of the light source carriers $f_0$, $f_0 \pm fm$, $f_0 + 2fm$, . . . ($f_0$ denotes the frequency of the single mode light input to the optical modulator and fm denotes the frequency of the RF signal applied to the phase modulation means). Accordingly, it is possible to suppress the frequency fm of the RF signal applied to the phase modulation means to about a half of that in a conventional case of disposing the both LSB and USB in adjacent light source carriers. Thus, it is possible to greatly improve the CSO distortion.

It is preferable that the frequency fm applied to the phase modulation means is greater than a maximum modulation frequency $\Delta f$ applied to the SSB modulation means and less than two times of the maximum modulation frequency, which cannot be realized in the conventional optical modulator. Thus, it is possible to improve the characteristics of the optical modulator.

Meanwhile, in the optical modulator shown in FIG. 9, only the light source carrier component having the same frequency as the frequency $f_0$ of the signal mode light in the light wave passing through the intensity adjustment means 32 and the phase adjustment means 33 is reduced, but, in the optical modulator shown in FIG. 11, the light outputs of all the light source carrier components $f_0$, $f_0 \pm fm$, $f_0 \pm 2fm$, . . . can be reduced.

As mentioned above, according to the present invention, it is possible to provide an optical modulator which magnifies a modulation index and reduces affection of SBS by suppressing a light source carrier component in an equivalent light source spectral width and performs long-distance transmission by suppressing one of sideband spectrums generated by a modulation signal to reduce affection of fiber dispersion.

In addition, it is possible to provide an optical modulator in which these functions are incorporated on one substrate and which can reduce the number of peripheral circuits and have excellent cost performance.

What is claimed is:

1. An optical modulator comprising:
   a light branch means that branches input light having a carrier component into two branched light waves;
   an SSB modulation means that optically modulates one of the two branched light waves and generates a light wave having the carrier component and one sideband spectrum;
   an intensity adjustment means that adjusts light intensity of the carrier component of a second of the two branched light waves;
   a phase adjustment means that adjusts the phase of the carrier component with respect to at least one of the two branched light waves; and
   a multiplexing means that multiplexes the two branched light waves passing through the SSB modulation means, the intensity adjustment means, and the phase adjustment means, and emits output light.

2. The optical modulator according to claim 1, wherein the SSB modulation means comprises a Mach-Zehnder optical waveguide having two branch waveguides, and electrical fields of two RF signals having a phase difference of 90° are applied to light waves which propagate through the branch waveguides, respectively.

3. The optical modulator according to claim 1, wherein the intensity adjustment means comprises a Mach-Zehnder optical waveguide having two branch waveguides, and an electrical field of a DC voltage is applied to at least one of light waves which propagate through the branch waveguides.

4. The optical modulator according to claim 1, wherein the light branch means or the multiplexing means is composed of a Y-shaped branch waveguide.

5. The optical modulator according to claim 1, wherein the light branch means, the SSB modulation means, the intensity adjustment means, the phase adjustment means, and the multiplexing means are mounted on one substrate having an electrooptic effect.

6. The optical modulator according to claim 1, wherein a phase modulation means is provided at previous stage of the light branch means, or between the light branch means and the SSB modulation means.

7. The optical modulator according to claim 6, wherein a frequency applied to the phase modulation means is greater than a maximum modulation frequency applied to the SSB modulation means, and less than two times the maximum modulation frequency applied to the SSB modulation means.

8. The optical modulator according to claim 2, wherein the intensity adjustment means comprises a Mach-Zehnder optical waveguide having two branch waveguides, and an electrical field of a DC voltage is applied to at least one of light waves which propagate through the branch waveguides.

9. The optical modulator according to claim 2, wherein the light branch means or the multiplexing means is composed of a Y-shaped branch waveguide.

10. The optical modulator according to claim 3, wherein the light branch means or the multiplexing means is composed of a Y-shaped branch waveguide.

11. The optical modulator according to claim 1, wherein the light branch means or the multiplexing means is composed of a directional coupler.

12. The optical modulator according to claim 2, wherein the light branch means or the multiplexing means is composed of a directional coupler.

13. The optical modulator according to claim 3, wherein the light branch means or the multiplexing means is composed of a directional coupler.

14. The optical modulator according to claim 2, wherein the light branch means, the SSB modulation means, the intensity adjustment means, the phase adjustment means, and the multiplexing means are mounted on one substrate having an electrooptic effect.

15. The optical modulator according to claim 3, wherein the light branch means, the SSB modulation means, the intensity adjustment means, the phase adjustment means, and the multiplexing means are mounted on one substrate having an electrooptic effect.

16. The optical modulator according to claim 4, wherein the light branch means, the SSB modulation means, the intensity adjustment means, the phase adjustment means, and the multiplexing means are mounted on one substrate having an electrooptic effect.

17. The optical modulator according to claim 2, wherein a phase modulation means is provided at a previous stage of the light branch means, or between the light branch means and the SSB modulation means.

18. The optical modulator according to claim 3, wherein a phase modulation means is provided at a previous stage of the light branch means, or between the light branch means and the SSB modulation means.

19. The optical modulator according to claim 4, wherein a phase modulation means is provided at a previous stage of the light branch means, or between the light branch means and the SSB modulation means.

20. The optical modulator according to claim 5, wherein a phase modulation means is provided at a previous stage of the light branch means, or between the light branch means and the SSB modulation means.

* * * * *